United States Patent
Ju et al.

(10) Patent No.: US 10,186,300 B2
(45) Date of Patent: Jan. 22, 2019

(54) METHOD FOR INTUITIVELY REPRODUCING VIDEO CONTENTS THROUGH DATA STRUCTURING AND THE APPARATUS THEREOF

(71) Applicant: PROMPT, INC., Seoul (KR)

(72) Inventors: Hyun Sun Ju, Seongnam-si (KR); Hae Myung Choi, Seoul (KR); Byung Ho Choi, Seoul (KR)

(73) Assignee: VEAVER, INC. (KR)

( * ) Notice: Subject to any disclaimer, the term of this patent is extended or adjusted under 35 U.S.C. 154(b) by 0 days.

(21) Appl. No.: 15/188,900

(22) Filed: Jun. 21, 2016

(65) Prior Publication Data

US 2017/0011774 A1    Jan. 12, 2017
US 2018/0130499 A9    May 10, 2018

(30) Foreign Application Priority Data

Jul. 10, 2015  (KR) .................. 10-2015-0098347
Jul. 10, 2015  (KR) .................. 10-2015-0098355

(51) Int. Cl.
*G11B 27/28*      (2006.01)
*G11B 27/034*     (2006.01)
*G11B 27/34*      (2006.01)

(52) U.S. Cl.
CPC ........... *G11B 27/28* (2013.01); *G11B 27/034* (2013.01); *G11B 27/34* (2013.01)

(58) Field of Classification Search
CPC ........ G11B 27/28; G11B 27/34; G11B 27/034
USPC ...................................................... 386/241
See application file for complete search history.

(56) References Cited

U.S. PATENT DOCUMENTS

2008/0036917 A1* 2/2008 Pascarella .............. G11B 27/11
                                                              348/702
2009/0150947 A1* 6/2009 Soderstrom ....... G06F 17/30817
                                                                725/93

FOREIGN PATENT DOCUMENTS

| JP | 2010268195 A | 11/2010 |
|----|---|---|
| KR | 20050095229 A | 9/2005 |
| KR | 0854143 B1 | 8/2008 |
| KR | 20120004674 A | 1/2012 |
| KR | 1150727 A | 5/2012 |
| KR | 20120079442 A | 7/2012 |
| KR | 20130057298 A | 5/2013 |
| KR | 20140055796 A | 5/2014 |
| KR | 1445922 B1 | 9/2014 |
| KR | 20150013381 A | 2/2015 |

* cited by examiner

*Primary Examiner* — Thai Q Tran
*Assistant Examiner* — Nien Yang
(74) *Attorney, Agent, or Firm* — Renaissance IP Law Group LLP

(57) ABSTRACT

The present disclosure relates to a method for intuitively reproducing video contents through data structuring and the apparatus thereof, more specifically, which searches section by section the video contents edited and provided based on section with free search, hash tag, and/or bookmark, produces a new video contents from the searched sections of the video contents, and therefore promotes consumption of the video contents by providing reproduced video contents. The video contents can be edited and played by using a user interface intuitively figuring out the structure of video contents.

7 Claims, 14 Drawing Sheets

(a)  (b)

METHOD FOR INTUITIVELY REPRODUCING VIDEO CONTENTS THROUGH DATA STRUCTURING AND THE APPARATUS THEREOF

TECHNICAL FIELD

The present disclosure relates to a method for intuitively reproducing video contents through data structuring and the apparatus thereof, more specifically, which searches section by section the video contents edited and provided based on section with free search, hash tag, and/or bookmark, produces a new video contents from the searched sections of the video contents, and therefore promotes consumption of the video contents by providing reproduced video contents. A user interface device for intuitively figuring out the structure of video contents and the method thereof is also provided. Wherein, the device provides an easy control function for searching and moving between the video contents and related contents by providing contents navigation capable of section-based search of the data in video contents and the video contents induces user participation such as bookmark and reply and intuitively identifying the data structure of the video contents.

BACKGROUND

The conventional way of video contents consumption is mainly to watch passively video contents produced and serviced by contents distributors such as broadcasting companies. Hence it is difficult for a video contents user to find wanted portions of the video having a long period of playtime.

For example, if a user wishes to watch wanted portions of a video contents such as news, documentary, or black box video that does not have cut compilation commonly, the user spend a lot of time to watch them; and if a user wishes to repeatedly watch a specific unit of a video contents such as cooking program to follow the specific recipe shown in that unit, it is difficult for the user to watch again that unit because the user is required to search the entire video contents.

Moreover, it is restrictive for an individual user to produce and provide video contents since the user is required to buy expensive equipment and should be familiar with advanced technologies in order to produce and distribute the video contents and the produced video contents can be circulated through very limited distribution channels (e.g. TV or storage media such as CD or DVD).

However, as the smart media era has started with the advancement of communications network environments, the consumption pattern of using online video contents is changed such that a user who was previously watching video contents passively has changed into a contents provider who produces and distributes video contents by oneself and actively shares them with other users by interacting through social network services (SNSs) and sharing information.

The proportion of users making use of video contents in real-time with smart TV, PC, or mobile device is increasing drastically; in addition, the rapid evolution of communication networks creates added values of decreasing the cost for production, consumption, and distribution of video contents and increasing the speed of spreading them. As the cost of producing video contents for users of consuming video contents and the distribution channels of video contents such as website, SNS, or OTT services are not restricted to professional contents providers but open to everybody, the size of video contents providers is therefore increasing and diversifying.

In addition, the user interface technology has developed rapidly, which eliminates the technical barrier between professional contents providers such as a TV broadcasting company and general users in producing and distributing video contents and helps individualized video contents production and service. Hence a new era has arrived in which an individual user can direct, produce, publish video contents through an open distribution network and therefore make added values without having advanced techniques and expensive equipment.

Following the current trend, a user want more to reproduce new video contents by making use of their own video contents in such a way that the user produce a new video contents composed of video contents containing information the user needs or the user provides other users with a new video contents containing information which they need or are interested in.

Hence it is required to develop technologies for users to easily utilize video contents and to reproduce new video contents by making use of necessary information in the video contents.

The present disclosure proposes a method for intuitively reproducing video contents through data structuring and the apparatus thereof in which shares information on the video contents with other users by providing functions for tagging information, reply, or memo section by section and also produces a new video contents from the searched sections of the video contents by searching directly sections of the video contents containing information that a user needs.

Moreover, conventionally the consumption of video contents was carried out mainly by watching TV on the time of broadcasting the wanted program or by playing and watching the video contents contained in the storage media such as videotapes, video CD or DVD with the dedicated playback device after borrowing the storage media.

In addition, as the communications technology is developed, downloading of video contents with a user's equipment becomes available so that constraints on time and place in watching the video contents are lessened; but there still remains a problem in taking a long time to download and play large sized files containing video contents.

However, recently network, multimedia, user equipment and platform technologies are developed rapidly and the cloud as a virtual storage space in the network can be used to store and retrieve video contents. Therefore users can play and enjoy diverse video contents anytime anywhere regardless of time, playback device or place.

In addition, as streaming technology in which multimedia file including video contents are transferred and played and chunk-based video contents transmission technology are used, the user can play the corresponding video contents at the same time while downloading the video contents. Thus the waiting time required for using video contents is dramatically reduced and therefore the consumption of video contents by users is largely increased. In other words, online viewing of video contents with a PC or a smartphone on the web such as YouTube or social network service (SNS) is popular whereas previously watching TV on the time of broadcasting the wanted program or watching the video contents contained in the storage media (e.g. videotapes, video CD or DVD) with the dedicated playback device was used in the past.

In addition, as mobile communications terminals such as smart devices are extensively used, the consumption of video contents is drastically increased since the consumption is possible regardless of time and place and the competition among video contents providers becomes fierce more and more.

In addition, in making use of video contents, the users want interacting with other users in real-time by using reply or comment rather than simply watching the video contents produced and supplied by the video contents providers, and participating in making video contents by reproducing a new video contents from the relevant video contents through bookmarking or similar functions.

According to this trend, the need for an optimized user interface to video contents, which provide the video contents users with ease of use and support diverse functions to use necessary information in the video contents, is increased a lot.

However, the conventional interface for utilizing video contents provides only basic and simple functions such as play, pause, stop, fast forward or rewind, and playback speed control of video contents though the interface provides a function to play and watch the video contents easily with portable devices anytime and anywhere.

In addition, in case that a user wants to search sections of video contents, the user searches desired sections of the video contents using a seek bar, generally called time bar or seek bar, shown on the scale of the duration of playtime for the video contents; and the desired sections is found finally with several search trials.

The present disclosure proposes a user interface device for playing and editing video contents and the method thereof which supports interaction with other users by writing replies for each section in providing the edited section-based video contents by video contents providers and additionally enables prompt search of the corresponding video by making users to edit each section of the corresponding video contents and bookmark desired sections by themselves.

Next, we briefly review previous techniques in the related field of this present disclosure and then describe discriminative technical solutions to improve previous techniques.

Firstly, Korea published patent KR2012-0004674A (Jan. 13, 2012) relates to a production method of clip contents and the display apparatus thereof using the clip; the clip contents production method describes a video clip making technique composing sections of a video contents including the following three steps: (i) selecting the first and the second clip contents from a previously produced clip contents, (ii) deciding the order for combining the first and the second clip contents, and (iii) creating a third clip contents by combining the first and the second clip contents.

The above preceding technique is implemented to provide differentiated contents provision service by producing complete clip contents through combining previously existing clip contents, sharing easily the clip contents with other users, and making other contents using the restricted contents.

On the other hand, this present disclosure does not use previously existing clip contents but creates a new video contents by subdividing a video contents into sections using playback and editing interface, structuring data information for each section and selecting and combining desired sections of the video contents that contain information a user want with various access methods using data structured section information.

Korea registered patent KR1445922 (Sep. 23, 2014) relates to a knowledge contents reproduction method via social network service; it enables users to make and add a thumbnail to the knowledge contents at a specific time of a learning resource while studying the corresponding learning resource provided and displayed with a user equipment, to learn together with other users who are studying the same learning resource online or offline and to receive learning guidance from a lecturer by saving and sharing the conversation below the learning resource layer at the space of social network service, and to accumulate and share knowledge made by users based on learning resources;

The above preceding invention reproduces and enlarges the knowledge contents repeatedly by sharing questions on the learning resource and providing feedbacks among users connected with social networks, and builds knowledge contents through the social network service among users planned together offline so as to increase learning effect.

On the other hand, this present disclosure searches the section of a video contents containing information a user need with bookmarks or hash tags and immediately reproduces a new video contents using the search result.

Korea published patent KR2012-0079442 (Jul. 12, 2012) relates to a user interface apparatus and the method thereof, which implements a display unit presenting multiple videos at the same time and a control unit playing multiple videos at the same time and the selected videos from the multiple videos played so as to display multiple segments of the identical video to a display apparatus at the same time, and select and watch the desired segment of the video a user want to play using enlarged screen or full screen mode.

The above preceding invention is similar to this present disclosure in that it can select and watch specific segments of a whole video contents; however, this present disclosure offers technical features to make bookmarks on sections of a video divided by sections and provide a playing sequence of the bookmarked video sections so as to watch immediately the corresponding sections of video, and further to reproduce a new video contents combining the above bookmarked video sections.

Korea published patent KR2012-0079442 (Jul. 12, 2012) relates to a user interface provision device and the method thereof which plays simultaneously multiple videos for users to select desired videos from the multiple playing frames. For this purpose, the above preceding technique comprises a displaying unit that displays simultaneously multiple playing videos and a control unit that plays simultaneously multiple videos and also selected videos from the multiple playing videos.

The above preceding technique can display simultaneously multiple segments of the same video and a user selects one segment from the multiple segments to display in an enlarged screen or a full screen so as to select and watch desired sections of the entire video for the user.

On the other hand, the present inventive concept is devised to provide a function for a user to write and manage user data (e.g. memo, bookmark) in the user's desired sections of a video when using the video contents. Hence, the user can select and manage the interesting sections of a video contents to the user; and watch immediately the interesting sections of a video if the access method to the sections is provided using bookmark function.

In addition, Korea registered patent KR1150727 (May 22, 2012) relates to a video control method by manipulating objects in the video playing in a portable device and the portable device thereof, which features supporting functions playing and presenting video contents containing objects to a displaying unit; identifying selecting of specific objects through a touch detecting unit installed on the displaying unit; extracting control commands corresponding to a specific object after inquiring on a control command mapping table and displaying on the displaying unit; identifying the selected control command from the control commands displayed in the displaying unit and performing the related control functions with playback of the video contents; determining whether a specific object performs video control after inquiring on an object mapping table; and controlling the related scene with the specific object.

The above preceding technique is devised to support diverse and detailed control functions for intuitively manipulating video contents while playing them with portable devices, for example, watching a video contents from the scene a specific object appears, skipping over the scene where a specific object disappears, or watching a batch of scenes containing a specific object.

On the other hand, the present inventive concept is devised for users to intuitively identify the meaning for a corresponding section in the entire contents of a video by writing comments for each section in providing the edited section-based video contents by video contents providers so as to promptly search and play the interesting sections to the users; and additionally to immediately move and watch video sections related with the information a user selected when the user choose an item from the displayed list of information items, provided by the video contents providers, for each section of playing video contents.

SUMMARY

This present disclosure is devised to solve the above problems, the objective of which is providing an intuitive method and the apparatus thereof for reproducing a new video contents through data structuring by subdividing information of a video contents, used only for metadata of the video contents, section by section through a user interface, structuring data information for each section, providing various access methods to the video contents using structuring of numerous data the video contents has, and searching and combining sections of the video contents that contain information a user needs through the above various access methods.

Another objective of the present disclosure is providing a user interface device for editing and playing video contents the method thereof, which provides video contents navigation capable of searching based data or frame in the video contents; supports interaction with other users in real-time with reply and bookmark functions; enables a user to identify easily characteristics of the corresponding video contents in making use of video contents by supporting control functions for searching and moving between the video contents and related contents; and promptly search and play sections of video contents interesting to the user.

In accordance with an embodiment of the present disclosure, the video contents reproducing apparatus through data structuring features including a video section searching unit which searches section by section at least one of video contents based on the search condition a user provides; a video section collecting unit which collects selectively desired video sections from at least one of search results provided by the above video section searching unit; and a video section combining unit which reproduces a new video contents by combining at least one of video sections collected with the above video section collecting unit.

In addition the above search condition features consisting of information such as bookmark, hash tag, reply, video section information, memo, keyword or combinations thereof.

In addition, the above video contents reproducing apparatus features including further an analysis unit which provides users with combining conditions for grouping or rearranging video sections collected from the above video section collecting unit based on time, place, character, genre, statistics or combinations thereof.

In addition, the video contents reproducing apparatus features including further a result verifying unit which provides users with reproduced video contents made with the above video section combining unit and a video contents correcting unit which deletes some or all of specific video sections in the above reproduced video contents and corrects the above reproduced video contents by adding new video sections.

In addition, the above video contents reproducing apparatus features provisioning user customized advertisement before or after a specific section and/or the video sections reproduced according to the above time, place, character, statistics or combinations thereof.

Moreover, in accordance with an embodiment of the present disclosure, the video contents reproducing method through data structuring features including a video section search phase in which a user searches section by section at least one of video contents based on the search condition entered with the video section searching unit; a search result accumulation phase in which the information on at least one search result explored with the video section searching unit is accrued; a video section collecting phase in which selected video sections from the information on accumulated search results are collected; and a video section combining phase in which a new video contents is created with the video section combining unit by combining at least one of video sections collected with the above video section collecting unit.

In addition, the above video contents reproducing method features including further an analysis phase in which the analysis unit provides users with combining conditions for grouping or rearranging video sections collected from the above video section collecting unit based on time, place, character, genre, statistics or combinations thereof.

In addition, the video contents reproducing method features including further a result verifying phase in which the result verifying unit provides users with reproduced video contents made with the above video section combining unit; and when the above reproduced video contents is modified by deleting some or all of specific video sections or adding new video sections after verifying the reproduced video contents, a new video contents is reproduced through the above video section combining phase in which at least one modified video section or more are combined again.

In addition, the video contents reproducing method features including further a result verifying phase in which the result verifying unit provides users with reproduced video contents made with the above video section combining unit; and when the above reproduced video contents is modified by deleting some or all of specific video sections or adding new video sections after verifying the reproduced video contents, a new video contents is reproduced through the above analysis phase and the above video section combining phase in which analysis is performed upon the video sections except the fixed sections if some of video sections are fixed or the analysis is performed upon all of the video sections otherwise.

In addition, the video contents reproducing method features provisioning user customized advertisement before or after a specific section and/or the video sections reproduced according to the above time, place, character, statistics or combinations thereof.

In accordance with an embodiment of the present disclosure, the user interface device for editing and playing video contents features including a video displaying unit which presents video contents on the display device of a user terminal; a timeline displaying unit which shows section information of the above video contents; and a data displaying unit which presents user data and provider data on the display device of the user terminal; the above provider data is supplied by the provider of the above video contents and the above user data is supplied by the user.

In addition, the above user interface device features including further a data input unit with which the above user enters user data such as bookmark, reply, emoticon, recommendation, caption, section designation or combinations thereof or the above provider enters provider data such as section title, section guide button, section displaying area, section displaying area explanation, related contents, advertisement or combinations thereof.

In addition, the above timeline displaying unit features including a seek bar which displays the entire search interval of the above video contents; a search button for searching the above video contents in the above seek bar; a section indicator which displays section information of the above video contents.

In addition, the above timeline displaying unit features displaying a pre-determined scale independently of the play time for the above video contents so that the user or the provider of the above video contents can perform searching of the above video contents without restriction of direction (from side to side).

In addition, the above video displaying unit features displaying related contents if the above user selects the above section guide button.

On the other hand, if the above user selects a wanted item from the list of corresponding related contents when the above related contents are displayed, then the video contents containing the video section related with the selected item is shown and the corresponding video section is played.

In addition, the above section indicator features; including displaying the degree of user participation for each section by showing the degree of user participation as height of a bar, FIG., or combinations thereof; or setting up and displaying a bookmark for a specific section.

Moreover, the user interface method for editing and playing video contents features including a video displaying phase in which video contents are presented on the display device of a user terminal; a timeline displaying phase in which section information of the above video contents is shown; and a data displaying phase in which user data and provider data are presented on the display device of the user terminal; the above provider data is supplied by the provider of the above video contents and the above user data is supplied by the user.

In addition, the above user interface method features including further a data input phase in which the above user enters user data such as bookmark, reply, emoticon, recommendation, caption, section designation or combinations thereof or the above provider enters provider data such as section title, section guide button, section displaying area, section displaying area explanation, related contents, advertisement or combinations thereof.

In addition, the above user interface method features including a synchronization phase in which the above user data or provider data entered and the above video contents are synchronized, and the above synchronization matches the sections of entered user or provider data with the corresponding section of video contents.

In addition, the above timeline displaying phase features including a phase in which the seek bar indicating the entire search interval of the above video contents is displayed; a phase in which the search button for searching the above video contents in the above seek bar is displayed; and a phase in which the section indicator showing section information of the above video contents is displayed.

In addition, the above timeline displaying phase features displaying a pre-determined scale independently of the play time for the above video contents so that the user or the provider of the above video contents can perform searching of the above video contents without restriction of direction (forward and backward).

In addition, the above video displaying phase features displaying related contents if the above user selects the above section guide button.

In addition, the above section displaying phase features; including further displaying the degree of user participation for each section by height of a bar, FIG., or combinations thereof using the above section indicator; or setting up and displaying a bookmark for a specific section.

Therefore, the present disclosure relates to a method for intuitively reproducing video contents through data structuring and the apparatus thereof. It contributes to promote consumption of the video contents through reproduced video contents made by searching section by section the video contents edited and provided based on section with free search, hash tag, and/or bookmark and producing a new video contents from the searched sections of the video contents.

In addition, the present disclosure relates a user interface device for editing and playing video contents the method thereof and provides contents navigation capable of section-based search for the video contents provisioned by video contents providers so as to search promptly.

In addition, the present disclosure enables a user to edit the above provided video contents section by section and manage the user's own video contents using section-based bookmark and memo functions.

In addition, the present disclosure enables a user to interact with other users by making use of functions like writing a reply or recommending the corresponding video contents in real-time.

DETAILED DESCRIPTION OF THE PREFERRED EMBODIMENTS

Hereinafter, a desirable embodiment of the present disclosure will be described in detail with reference to the accompanying FIG.s. The identical reference mark in each FIG. designates the same element.

Figure 1:
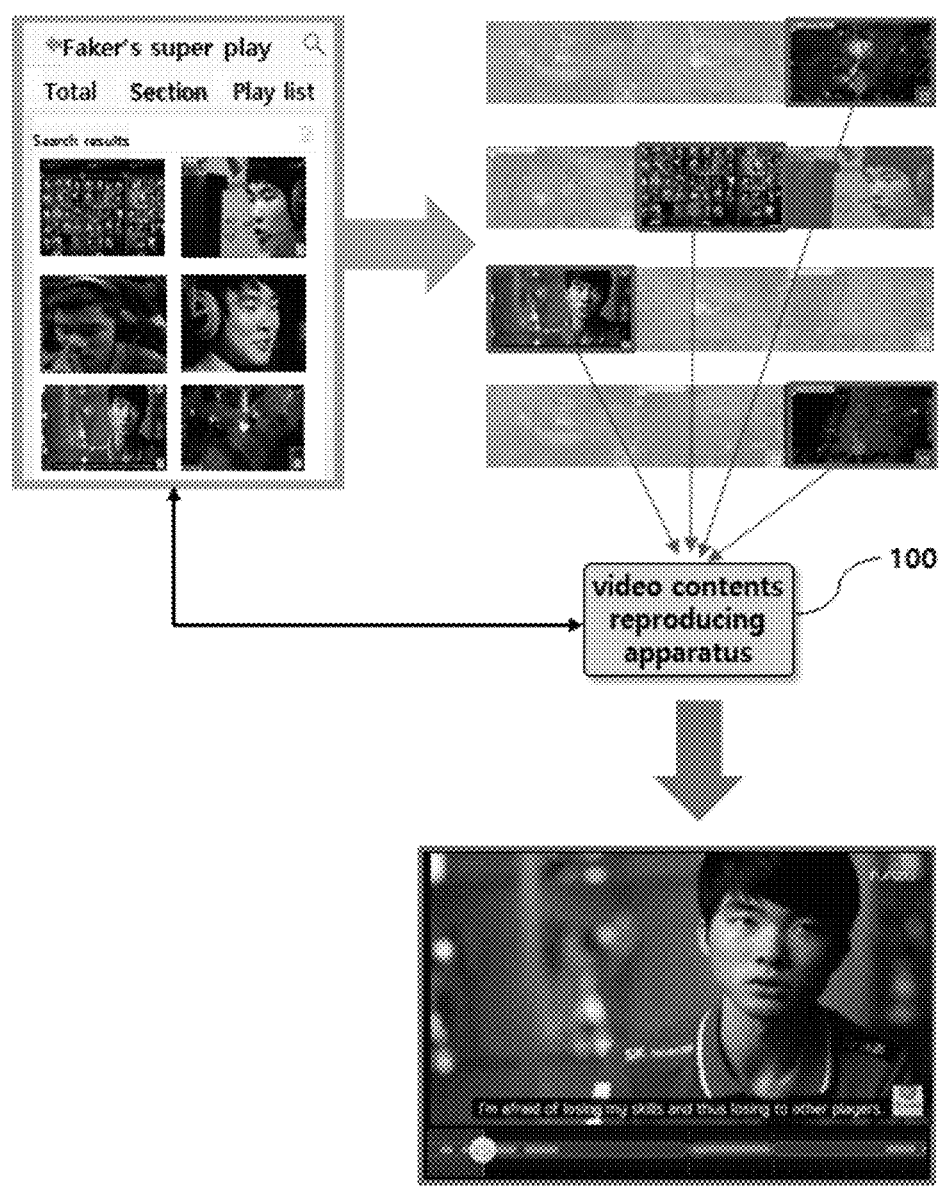
FIG. 1 is a concept diagram for explaining the method for intuitively reproducing video contents through data structuring and the apparatus thereof in accordance with an embodiment of the present disclosure.

FIG. 1 is a concept diagram for explaining the method for intuitively reproducing video contents through data structuring and the apparatus thereof in accordance with an embodiment of the present disclosure.

Firstly, a video contents provider can provide their own video contents edited section by section using a user interface unit on a server or a web page and a user using the video contents provided by the above video contents provider can also edit and utilize the corresponding video contents section by section.

At the same time, the method of editing the above video contents does not process and edit an original video contents but consists of subdividing the video contents section by section, creating a data file consisting of subdivided section information, and playing the original video file section by section using the above data file. In other words, the playback of the original video file is controlled according to the section information of the video contents by running the created data file.

If a video contents provider or a user edits the video contents section by section using the data file, they can write and insert a simple script. For example, in case of editing a cooking video contents section by section, they can add a comment of making a sauce section using a script or insert a hash tag information like '#tomato sauce' for the section of making a sauce. Additionally they can communicate with other users in real time by writing a reply or a simple memo for the corresponding section.

In addition, the above inserted script, hash tag, reply or memo provides various access methods for the corresponding video section and makes users to easily search and watch the video section containing the information users want by making use of free search, hash tag or bookmark.

In addition, the above user can and reproduce a new video contents by combining the selected video sections by selecting the above searched video sections based on the information the user needs. For example, in case of baseball video contents containing 9 inning plays, the video contents can be subdivided into video sections for each inning and a new video contents can be reproduced by selecting and combining video sections that contains a favorite player's plays.

As shown in FIG. 1, the video contents is edited section by section by a contents provider producing and providing video contents or a user making use of video contents provided by the above contents provider and stored in a database.

Meanwhile the above contents provider can be a user utilizing video contents other providers have provisioned and the above user can be a contents provider reproducing a new video contents making use of the above video contents. This fact can be inferred by a person who has ordinary knowledge in the field of the present disclosure and therefore we omit detailed explanations.

In addition, the above video contents reproducing apparatus 100 supports searching video sections that contains the information a user wants with a user interface, and the above user can search with the user interface.

At this moment, hash tag, bookmark or free search can be used as search condition as described earlier.

In addition, the above video contents reproducing apparatus 100 searches at least one of video contents section by section and presents search result to a display device as a list format when the above user requests search to find video sections containing the information the user wants, and the list format consists of searched video sections, the video contents containing the above video sections, and a playback list.

In addition, if the above user selects wanted video sections from the above list and requests combining of the selected video sections, the above video contents reproducing apparatus 100 combines the select video sections and presents the combined video contents to a display.

Meanwhile the above user requests multiple search queries, the above video contents reproducing apparatus 100 temporarily stores searched video sections in order and supports a user to select the video sections containing the information the user wants after the user completes searching for video sections. It is because the user requires multiple searches to find wanted video sections in detail when the user making use of the video contents searches the video sections.

Meanwhile if the user sets up a combining order, the video sections are combined according to the combining order when at least one of the selected video sections or more is combined.

In addition, if the user does not set up a combining order, the above video contents reproducing apparatus 100 provides users with combining conditions for grouping or rearranging video sections based on time, place, character, genre, statistics or combinations thereof for the selected video sections so as to combine the selected video sections.

Meanwhile the above statistics indicates quantified numbers such as the number of replies, the number of bookmarks, the number of playback, and the number of memos per characters and it can be combined according to the user traffic in ascending or descending order for video sections comparing the quantified statistics for the video sections. In addition, the above video contents reproducing apparatus 100 displays the above combined video contents and the combined video sections as a list format; the above user can verify whether the combined video contents contain the video sections having the information the user wants and modify the above video contents.

Moreover the above statistics can be used as grounds for attracting advertisers, and selling and charging advertisement.

In other words, as the consumption of video contents becomes popular, the advertisement before or after a specific section of the video contents showing high traffic volume can be inserted so that advertisement of products contained in the corresponding video contents or similar products or service related with the above products can be inserted dynamically. The advertisement effect can be reinforced by providing customized advertisement according to the corresponding video contents using the statistics of the video section including consumer information of the video contents and playback information.

Hereinafter, the above statistics is an embodiment of the present disclosure; above this time, place, character and genre can be used further.

Meanwhile the above search condition is explained in detail with reference to FIG. 4.

Figure 2:
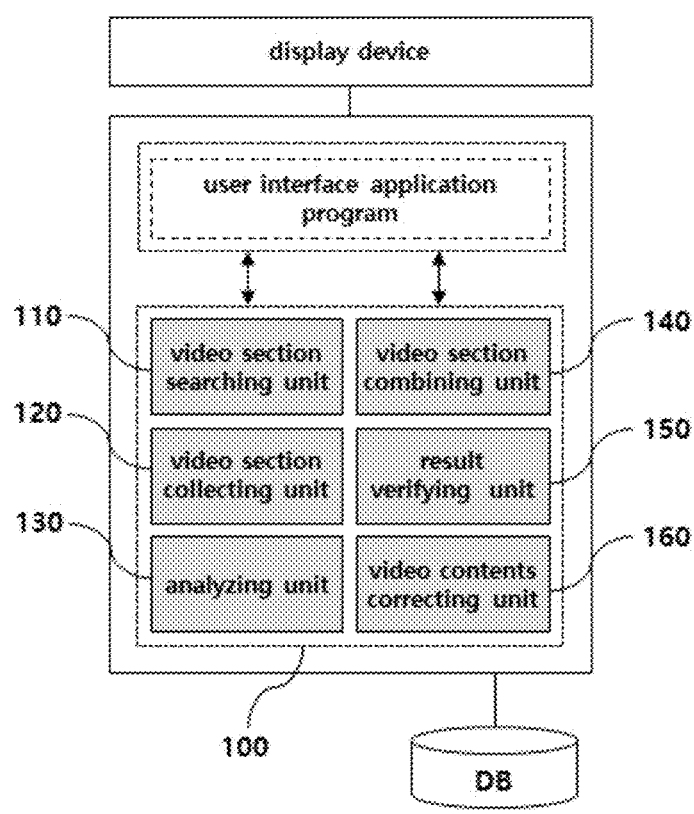
FIG. 2 is a block diagram for displaying the configuration of the apparatus for intuitively reproducing video contents through data structuring in accordance with an embodiment of the present disclosure.

FIG. 2 is a block diagram for displaying the configuration of the apparatus for intuitively reproducing video contents through data structuring in accordance with an embodiment of the present disclosure.

As shown in FIG. 2, the above video contents reproducing apparatus 100 comprises including a video section searching unit 110 which searches video sections containing the information a user wants from the section information of video contents; a video section collecting unit 120 which collects selectively desired video sections from the above multiple search results; an analyzing unit 130 which provides users with combining conditions for grouping or rearranging video sections collected from the above video section collecting unit based on time, place, character, genre, statistics or the combinations thereof; a video section combining unit 140 which reproduces a new video contents by combining multiple video sections collected with the above video section collecting unit according to the combining conditions analyzed with the above analysis unit; a result verifying unit 150 which provides users with the reproduced video contents and requests to verify whether the corresponding video sections containing the information they want are combined; and a video contents correcting unit 160 which deletes some or all of specific video sections in the above reproduced video contents and corrects the above reproduced video contents by adding new video sections.

In addition, the above video contents reproducing apparatus 100 comprises including a data processing function which synchronizes the original video contents and the data file consisting of section information when playing the video sections; a playback function which plays the above video contents; and a user interfacing function which presents the above video contents to a display device and edits them.

On the other hand, the data processing function, the playback function, and the user interfacing function can work as implemented into the video contents reproducing apparatus 100 or as interworked with the video contents reproducing apparatus 100 as a form of application program.

In addition, the video section searching unit 110 searches video sections using the data file consisting of the section information; when searching the video sections, the video section searching unit 110 uses bookmark information for each section, hash tag information for each section, or free search which utilizes the information entered by video contents providers such as basic contents information, section information, memo, reply etc. and the information entered by users.

Meanwhile the bookmark can provide an access method to the corresponding video section if a user bookmarks a specific video section and be used to easily write a memo if the user wants to enter one's own information.

In addition, the hash tag search uses a hash tag in the form of '# a specific word' which indicates that the video contents correspond to the specific word.

For example, a user can enter a keyword with a hash tag (e.g. #cook) after writing a tweet at Tweeter, a social network service (SNS), or enter keywords using the hash tag while writing a post.

In addition, if another user enters the same hash tag (#cook) while writing a post, there exist two posts for the same hash tag subject (#cook). When other SNS users search using hash tag (e.g. #cook), two posts are displayed according to the referred #cook.

Likewise if users enter a keyword to each video section with the hash tag in the present disclosure, the video sections containing the corresponding hash tag are displayed when the user searches using hash tag.

In addition, the video section searching unit 110 searches video sections containing the information a user wants in a video contents and presents search result to a display device as a list format when searching video sections the user wants in multiple video contents.

In addition, the video section collecting unit 120 collects video sections selected by the user from video sections searched with the video section searching unit 110 and given in the form of list format or all of video sections searched with the video section searching unit.

At this time the user can attempt multiple searches when searching desired video sections; if the user requests multiple searches, the video section searching unit 110 displays and temporarily stores searched video sections in order and supports the user to select video sections the user wants after the user completes searching for video sections.

As described earlier, when the user searches video sections, the video section search is performed not with the original video contents but with the data file that controls playback of the original video file.

In addition, the analyzing unit 130 analyzes combining conditions for combining the collected video sections. If the user designates a combining order for the collected video sections, the combining of video sections is performed according the order; it the user does not designate a combining order, combining conditions for grouping or rearranging video sections collected from the video section collecting unit 120 based on time, place, character, genre, statistics or combinations thereof are provided. If the user selects a combining condition, the collected video sections are combined according to the selected combining condition.

In addition, the combining condition can be set up beforehand or the pre-set default combining condition can be used to reproduce new video contents without a user selected combining condition.

In addition, the video section combining unit 140 reproduces a new video contents by combining the collected video sections according to the combining conditions analyzed with the analysis unit 130; the result verifying unit 150 presents the reproduced video contents and the combined video sections used for reproducing the contents to a display device and supports users to verify whether the corresponding video sections containing the information they want are combined.

In addition, the video contents correcting unit 160 deletes some or all of specific video sections in the reproduced video contents and corrects the reproduced video contents by adding new video sections; the video contents correcting unit can also be used for correcting the original video contents in addition to the new reproduced video contents.

Figure 3:
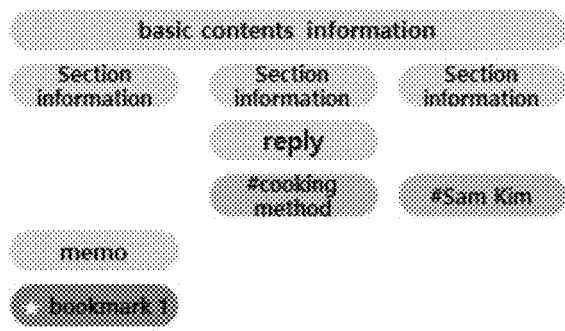
FIG. 3 is an exemplary diagram for explaining the structure of a data file consisting of section information accompanying to the original video contents in the method for intuitively reproducing video contents through data structuring and the apparatus thereof in accordance with an embodiment of the present disclosure.
Figure 3:
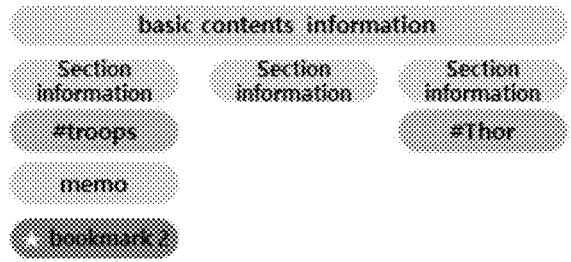
Figure 3:
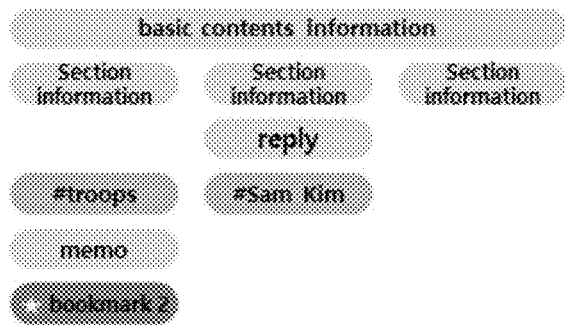

FIG. 3 is an exemplary diagram for explaining the structure of a data file consisting of section information accompanying to the original video contents in the method for intuitively reproducing video contents through data structuring and the apparatus thereof in accordance with an embodiment of the present disclosure.

As described above, the method of editing the above video contents does not process and edit an original video contents but consists of subdividing the video contents section by section, creating a data file consisting of subdivided section information, and controlling the playback of the original video file according to the section information of the video contents by running the created data file.

As shown in FIG. 3, the data file consisting of the section information comprises a basic contents information field containing the information on the original file, a section information field containing the information for each video section, a reply field containing the information on replies, a hash tag field containing hash tag information, a memo filed, and a bookmark filed.

Hence when playing the original video file by accessing the data file, the playback of the original video file is controlled according to the video section information contained in the above data file. With the reference to FIG. 3, for example, if the video contents a user uses is 'Help with refrigerator' and the playback section is the second section, the display device shows the corresponding video section of the contents and also section information, reply, and hash tag information (#cooking method).

In other words, the data file consisting of the section information and the original video file containing the corresponding video section should be synchronized and this can be done at the data processing unit as described above.

Figure 4:
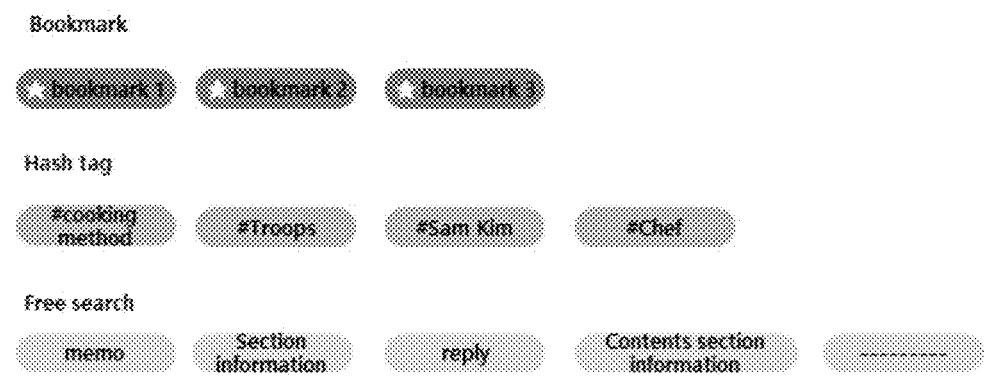
FIG. 4 is an exemplary diagram for explaining the search condition for searching video sections in the method for intuitively reproducing video contents through data structuring and the apparatus thereof in accordance with an embodiment of the present disclosure.

FIG. 4 is an exemplary diagram for explaining the search condition for searching video sections in the method for intuitively reproducing video contents through data structuring and the apparatus thereof in accordance with an embodiment of the present disclosure.

As shown in FIG. 4, the user can make use of bookmark, hash tag, or free search to search video sections containing the information the user wants.

The above bookmark can be used to search at least one of the bookmarked video sections using the moving path acquired with the bookmarks if the user bookmarks at least one of video sections in the used video contents by the above user.

In addition, in the search using the above hash tag information, a user or a provider sets up hash tags for each video section beforehand when editing the video contents.

With reference to FIG. 3, three video contents in FIG. 3 have hash tag information, respectively; using this hash tag information, if the user wants to search video sections containing Mr. Sam Kim, the user make use of '#Sam Kim' to search those video sections. At this time, the search unit displays the first video contents, 'Help with refrigerator,' the third video section of the first video contents, and the third video contents, 'Real guy,' the second video section of the third video contents as a list format.

In addition, in case of the above free search, the above user enters wanted information and the search unit searches memo, section information, contents section information, hash tag information, etc. for the video contents; if the search unit finds any matching information, it displays them to a display device as a list format.

However, various search function can be used in addition to bookmark, hash tag, and free search explained in the present disclosure.

For example, more detailed search function can be used such as searching the video section having the largest number of views among multiple video contents or searching the video section having the largest number of replies.

Figure 5:
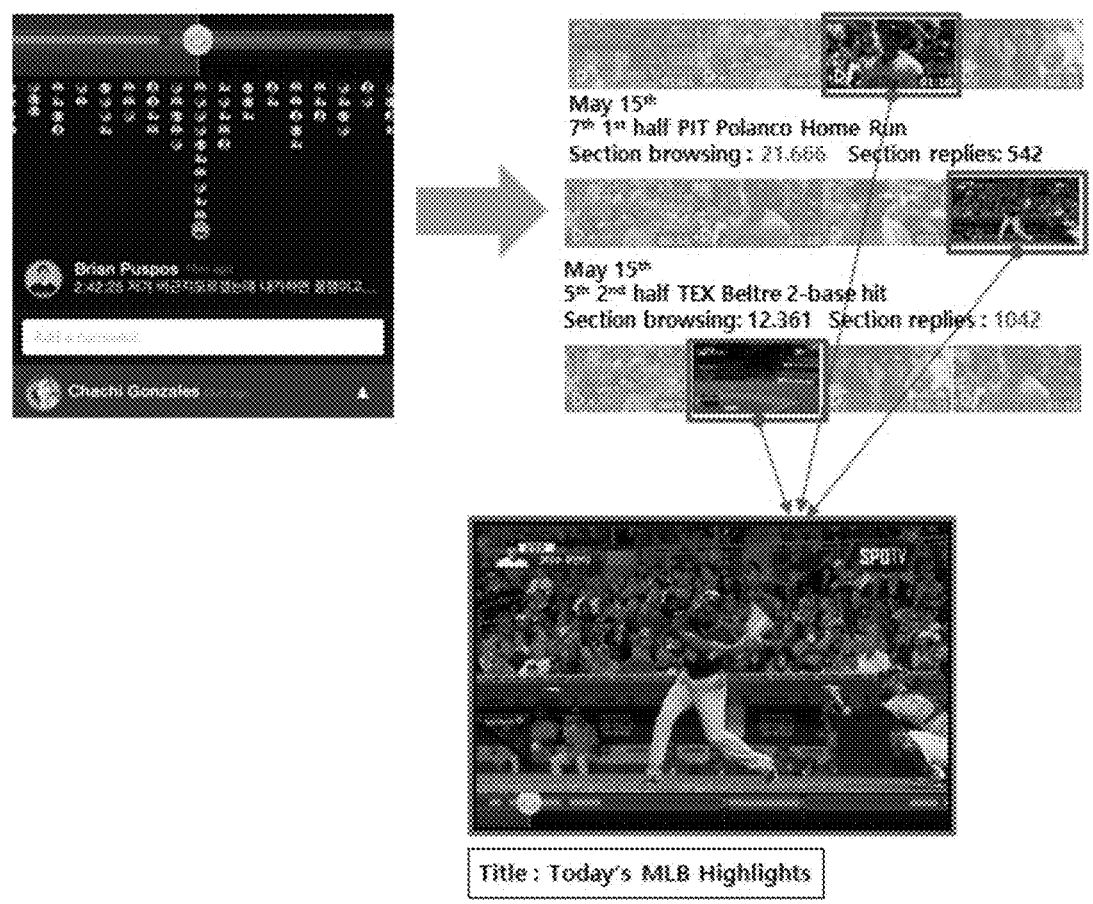
FIG. 5 is an exemplary diagram for explaining reproduction of a video contents by combining video sections in the method for intuitively reproducing video contents through data structuring and the apparatus thereof in accordance with an embodiment of the present disclosure.

FIG. 5 is an exemplary diagram for explaining reproduction of a video contents by combining video sections in the method for intuitively reproducing video contents through data structuring and the apparatus thereof in accordance with an embodiment of the present disclosure.

As shown in FIG. 5, it is already explained in detail earlier that the user can search video sections to reproduce video contents; thus the detailed explanation is omitted.

The section information for a video section consists of date, short explanation (for example, in case of the section information for baseball video contents, inning, name of team, name of player, type of batting, number of views for the section, number of replies for the section can be used); the user can search video sections using the section information.

For example, the highlight video on each playing day is reproduced by combining video sections which have the largest number of views or the largest number of replies on each playing day.

As described earlier, the video contents reproducing apparatus in the present disclosure reproduces new video contents using previously supplied video contents by combining video sections having the information many users want; it contributes to promote consumption of video contents through the reuse of existing video contents in addition to the spread of reproduced video contents so as to increase the traffic volume for the video contents.

Figure 6:
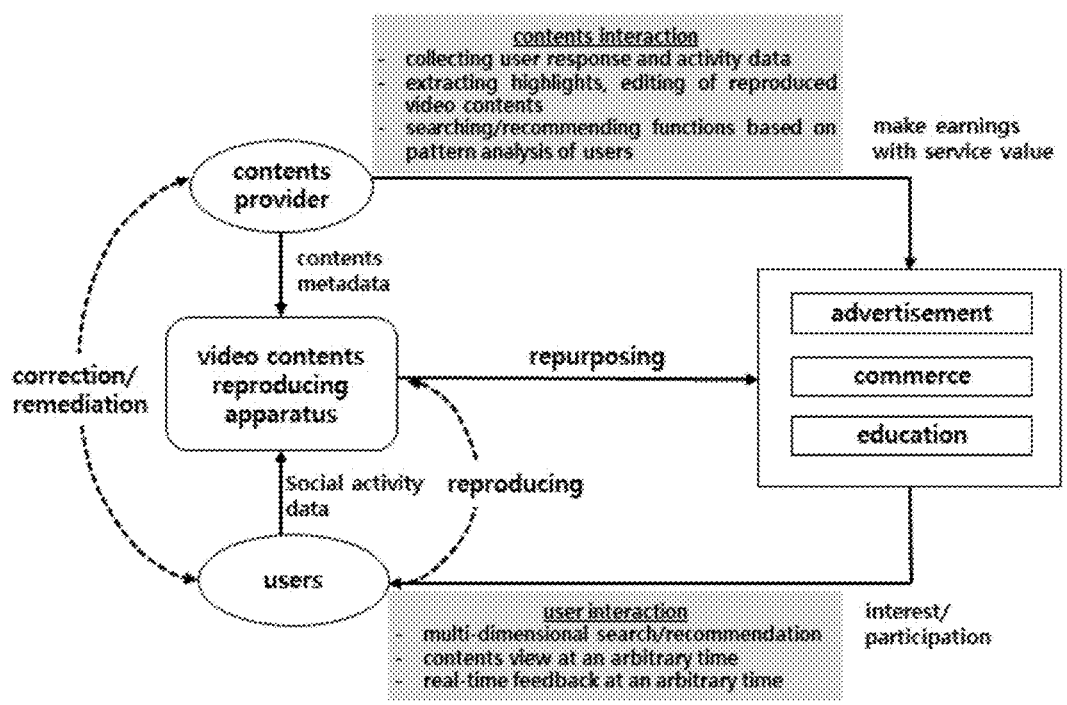
FIG. 6 is an exemplary diagram for illustrating working of the apparatus for intuitively reproducing video contents in accordance with an embodiment of the present disclosure as a next-generation media platform.

FIG. 6 is an exemplary diagram for illustrating working of the apparatus for intuitively reproducing video contents in accordance with an embodiment of the present disclosure as a next-generation media platform.

As shown in FIG. 6, the video contents reproducing apparatus in accordance with the present disclosure collects the contents metadata provisioned by contents providers and the response from users, and the social activity data and analyzes patterns for each data; it provides users with functions for extracting highlight sections of the video contents or combining some of other video contents into the video contents. Thus the user can search, recommend or reproduce customized contents. In addition the user performs repurposing in which the user arranges or produces reproduced video contents made with the video contents reproducing apparatus for the purpose of advertisement, commerce, or education The contents providers can provide so-called contents interaction service so as to make earnings, in which they provide functions for collecting user response and activity data, extracting highlights, and editing of reproduced video contents users created in addition to the video contents they provided and search/recommendation functions based on pattern analysis of users.

In addition, the video contents reproducing apparatus in accordance with the present disclosure provides users with multi-dimensional search and recommendation, contents view at an arbitrary time, and user interaction such as real-time feedback at an arbitrary time for reproduced and provided contents.

Moreover, the user and contents provider can offer guidelines through reciprocal correction and remediation work for enhancing the quality of the corresponding contents or reproducing contents.

Figure 7:
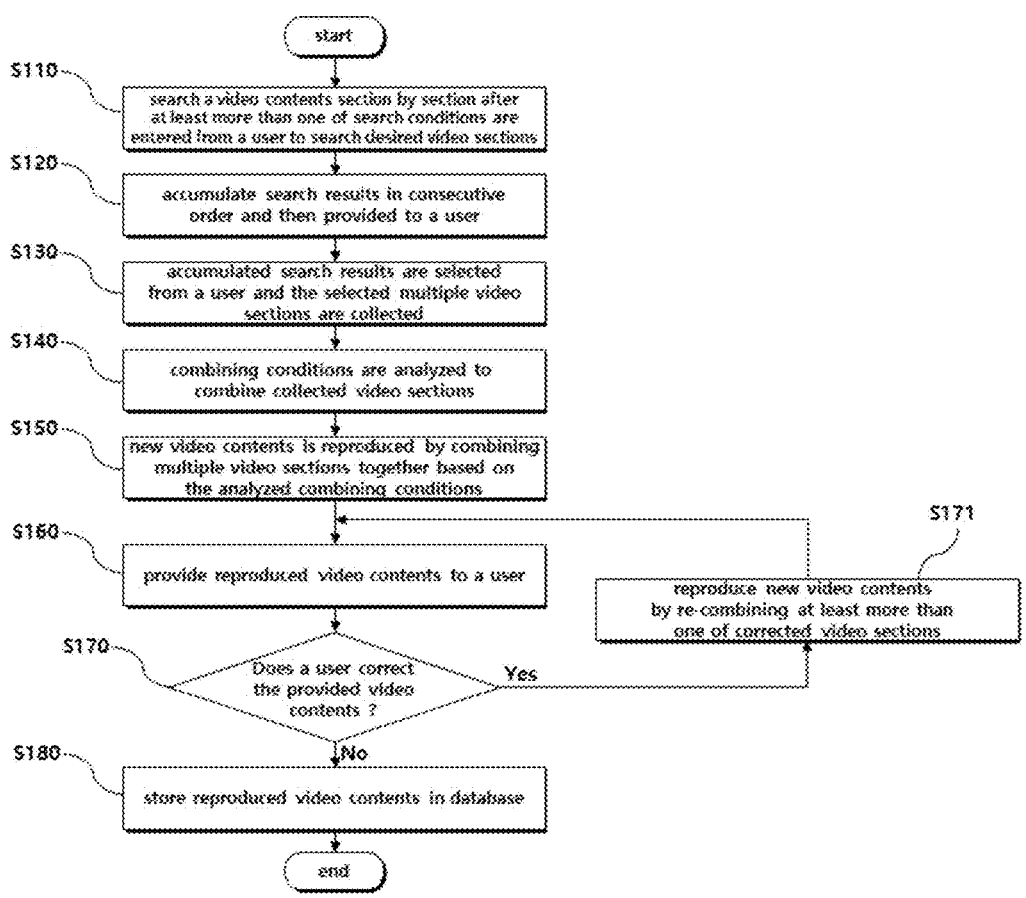
FIG. 7 is a flow chart for explaining the process of reproducing a new video contents using video contents in the user interface device and the method thereof for intuitively reproducing video contents through data structuring in accordance with an embodiment of the present disclosure.

FIG. 7 is a flow chart for explaining the process of reproducing a new video contents using video contents in the user interface device and the method thereof for intuitively reproducing video contents through data structuring in accordance with an embodiment of the present disclosure.

As shown in FIG. 7, the reproducing process of a new video contents using the video contents is firstly to search at least one of video contents section by section after the user enters search condition to search desired video sections (S110).

Next, the above user requests search multiple times with different search conditions for desired information. Then the search results are accumulated in consecutive order and then provided to the user (S120).

Next the user selects from the accumulated search results and the selected multiple video sections are collected (S130) and the combining conditions are analyzed to combine collected video sections (SS140). Meanwhile, the above combining conditions for grouping or rearranging video sections based on time, place, character, genre, statistics or combinations thereof are used to combine video sections in order.

Next a new video contents is reproduced by combining multiple video sections together based on the analyzed combining conditions (S150) and the reproduced video contents is provided to the user (S160).

Next if the user deletes some or all of specific video sections in the provided video contents and corrects the above provided video contents by adding new video sections (S170), then a new video contents is reproduced by re-combining at least more than one of corrected video sections (S171) and provided to the user (S160).

On the other hand, if the user fixes some of video sections in the modified and reproduced video contents and request the combining process, then the video sections except the fixed sections are analyzed in the analysis phase and a new video contents is produced by combining again at least one of video sections through the video section combining phase. This is because the fixed sections are not to be separated and to be moved as a group and the user can reproduce the corresponding video contents by using a different combining condition from the previous one.

In addition, if the user does not fix any specific video sections, a new video contents is made by combining again at least one of video sections after analyzing combining conditions for the new video sections and the entire video sections.

Then the above reproduced video contents is stored in the database (S180).

As explained above, the video contents reproducing method and the apparatus thereof in accordance with the present disclosure enables users to reproduce a new video contents using the corresponding video contents besides to merely watch them in consuming video contents so as to contribute to increase the traffic volume for the corresponding video contents through the dissemination of the reproduced video contents.

Figure 8:
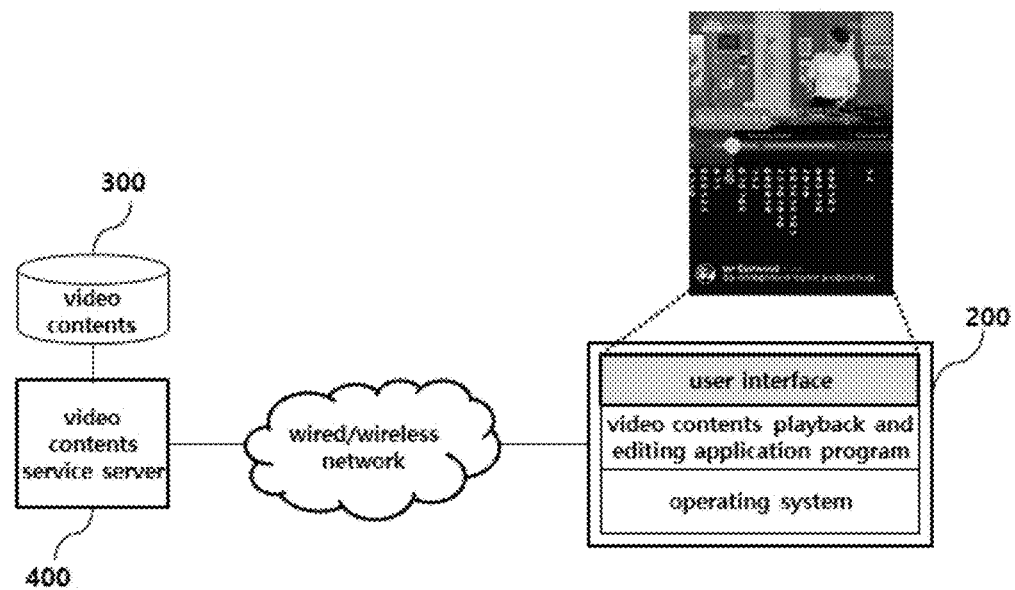
FIG. 8 is a conceptual diagram for explaining the user interface device for editing and playing video contents in accordance with an embodiment of the present disclosure.

FIG. 8 is a conceptual diagram for explaining the user interface device for editing and playing video contents in accordance with an embodiment of the present disclosure.

Firstly, a video contents provider can provide their own video contents edited section by section using a user interface unit on a server or a web page and a user using the video contents provided by the video contents provider can also edit and utilize the corresponding video contents section by section.

As shown in FIG. 8, if a video contents provider supplies video contents on a web page or a video contents service server 400, the video contents service server 400 provides a user with the supplied video contents and the user utilizes the corresponding video contents with the user interface device 200 for editing and playing video contents (hereinafter, called as the user interface device).

In addition, the user interface is displayed on the display device of a user terminal and explained in detail with reference to FIG.s in the following.

In addition, the fact that the video provider can be a user making use of the video contents is obvious to a person skilled in the arts, who has ordinary knowledge in the area the present disclosure belongs to.

The user interface device 200 to use the video contents provides not the simple information such as the current point of time in the entire contents that the existing user interface devices provide but the related information progressively as the video contents is played in order to offer optimal information.

In addition, the video provider provisions simple comment or section explanation and related contents information which the relevant video supplies through the user interface device 200 for the video contents to identify the contents of each section of the video. Additionally the user can edit the corresponding video contents section by section through the user interface device 200 and manage the edited video contents based on sections through memo or bookmark functions.

On the other hand, the information the video providers supply such as the comment and its related contents information is called as provider data hereinafter.

In addition, the user interface device 200 provides an easy access method to the related contents with a search button and a section moving function to navigate sections of the related contents.

In addition, the user writes a reply in real-time for each section of the corresponding video and watches and manages the desired sections of the corresponding video using memo or bookmark function.

In addition, the information the video users enter to the corresponding video contents such as the reply for each section or recommendation is called as user data hereinafter.

On the other hand, the user interface device 200 synchronizes the provider data or the user data entered in real-time with the corresponding video contents to present in the corresponding video contents and displays them.

The above synchronization is required to transfer correctly information on the reply of the user by synchronizing the section for the written reply with the section of the corresponding video contents when the user write a reply for each section of the corresponding video while playing the above video.

In addition, the user interface device 200 supports identifying and accessing to sections of the video contents by analyzing the degree of user participation for each section of the video. As described above, the user data includes reply for each section, recommendation, number of replay for each section of the video, number of bookmark and etc.

In addition, the above user interface device 200 edits the above video contents by interworking with the video contents playing and editing application program in the user terminal 200 or presents quantified user data information on the display device of the user interface device 200. In other words, the user interface device displays results by performing various functions interworked with other application programs on the display device.

The functions of the user interface device 200 are described in detail with reference to the following FIG.s.

Figure 9:
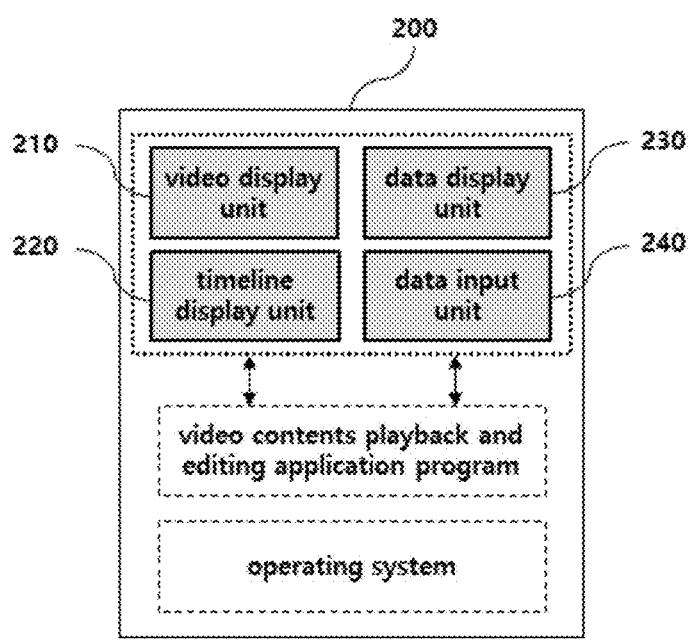
FIG. 9 is a block diagram for the configuration of the user interface device for editing and playing video contents in accordance with an embodiment of the present disclosure.

FIG. 9 is a block diagram for the configuration of the user interface device for editing and playing video contents in accordance with an embodiment of the present disclosure.

As shown in FIG. 9, the user interface device 200 comprises including a video display unit 210 which displays the video contents supplied by the above video contents providers on the display device of the user terminal, a timeline display unit 220 which displays section-information of the video contents, and a data display unit 230 which displays the user data and the provider data on the display device of a user terminal.

On the other hand, the provider data is supplied by the video provider of the video contents and designates section information for each section of the corresponding video contents, section guide button, section display area explanation, the related contents, or combinations thereof. In addition the user data is the information entered by the user through the user interface device 200 and designates bookmark, reply, emoticon, recommendation, section designation or combinations thereof.

In addition, the video display unit 210 displays the video contents edited section by section by the video provider or the user on the display device of the user terminal. In addition the section can be subdivided by the video provider or the user arbitrarily and the information on each section of the video contents is displayed more accurately as the section is divided in detail.

In addition the timeline display unit 220 provides not the simple information such as the current point of time in the entire video contents but the related information progressively as the video contents is played in order to offer optimal information.

In addition the timeline display unit 220 displays on the display device a seek bar which indicates the entire search section of the video contents shown in the video display unit 210, a search button which searches the video contents by moving the seek bar from side to side, and a section indicator which shows the section information of the video contents.

On the other hand, the user wanted section of the corresponding video using the search button. At this time, the timeline display unit 220 provides users with intuitively accessing the information of the playing video contents by extending the timeline according to the length of the video contents. Though the size of the display device is small, the display device shows continuously a larger size of timeline than the size of the actual display screen so that the user easily searches desired sections of the video contents from side to side. In addition as the screen is scrolled from side to side, the timeline is continuously shown and the video corresponding to the timeline is played accordingly so that the playback time and the size do not restrict the search.

In addition the search button shows the current position in the corresponding video contents; and the user searches or bookmarks wanted sections of the corresponding video contents by dragging the search button with mouse or screen touch, and additionally moves to the wanted section of the video to write replies.

In addition the user interface device 200 comprises including a data input unit 240 with which the user or provider enters data, the data entered with the data input unit 240 is displayed on the display device through the data display unit 230.

In addition the user interface device 200 can further comprise a data processing module which synchronizes the entered user data and provider data with the video contents supplied by the video contents provider and a user participation analysis function which presents the quantified results for each section by quantifying the entered user data on the display device.

Meanwhile the above data processing function and the user participation analysis function can be implemented in the user interface device 200, additionally interwork with other application programs running in the user terminal, and also be carried out in the above video contents service server 400.

In addition the section indicator displays on the display device 200 the quantified results acquired by the user participation analysis function quantifying the user data (reply, number of bookmark, recommendation, number of playback for each section, etc.); at this time the above section indicator uses the height of a bar in a graph format and the above user easily identifies principal sections of the corresponding video contents with the height of the section indicator.

In addition the data processing function performs synchronization process in which the user data or the provider data entered in real-time is synchronized with the corresponding video contents; if the user writes a reply at a section of the corresponding video, the data processing function supports showing the entered reply correctly at the exact section of the video.

Meanwhile the data display unit 230 displays on the display device synchronized user data or provider data processed at the data processing function.

Figure 10:
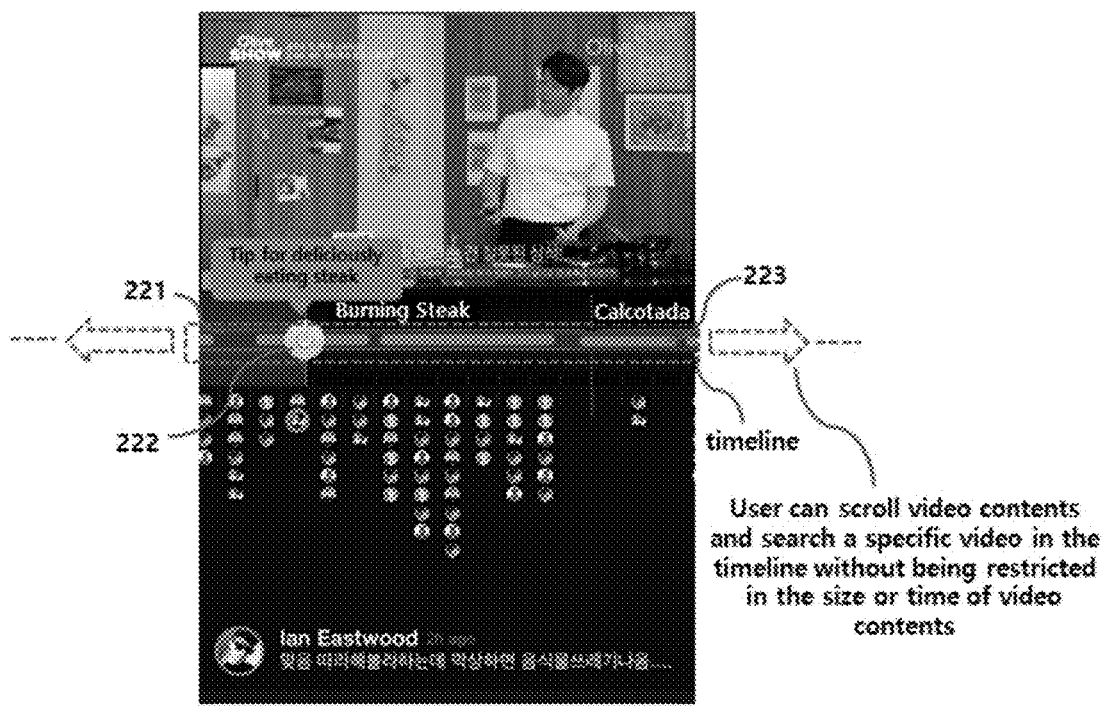
FIG. 10 is an exemplary diagram for explaining the timeline presented in the display device of a user terminal in the user interface device for editing and playing video contents in accordance with an embodiment of the present disclosure.

FIG. 10 is an exemplary diagram for explaining the timeline presented in the display device of a user terminal in the user interface device for editing and playing video contents in accordance with an embodiment of the present disclosure.

As describe above, the above timeline is displayed on the display device, consisting of a seek bar 221 which shows the entire search interval of the video contents displayed on the video display unit 210; a search button 222 which searches the video contents by moving from side to side in the seek bar 221; and a section indicator 223 which shows the section information of the video contents.

Meanwhile, the section indicator 223 quantifies the user data and uses the height of a bar as representing the quantified FIG.s; and the user easily identifies the degree of preference for the corresponding section and principal sections of the entire video contents using the section indicator 223.

In addition, the user searches desired section of the corresponding video using the seek bar 221; at this time, the user can navigate the desired video section to move the search button 222 displayed in the seek bar 221 from side to side, write a reply to the corresponding video section, and also manage the user's own contents with bookmark and memo function.

The functions embedded in timeline of the present disclosure include all the functions necessary for existing playback tools. The functions include play speed control, repetition of predetermined sections, playing back step by step, jump to arbitrary position of the video contents, etc.

Figure 11:
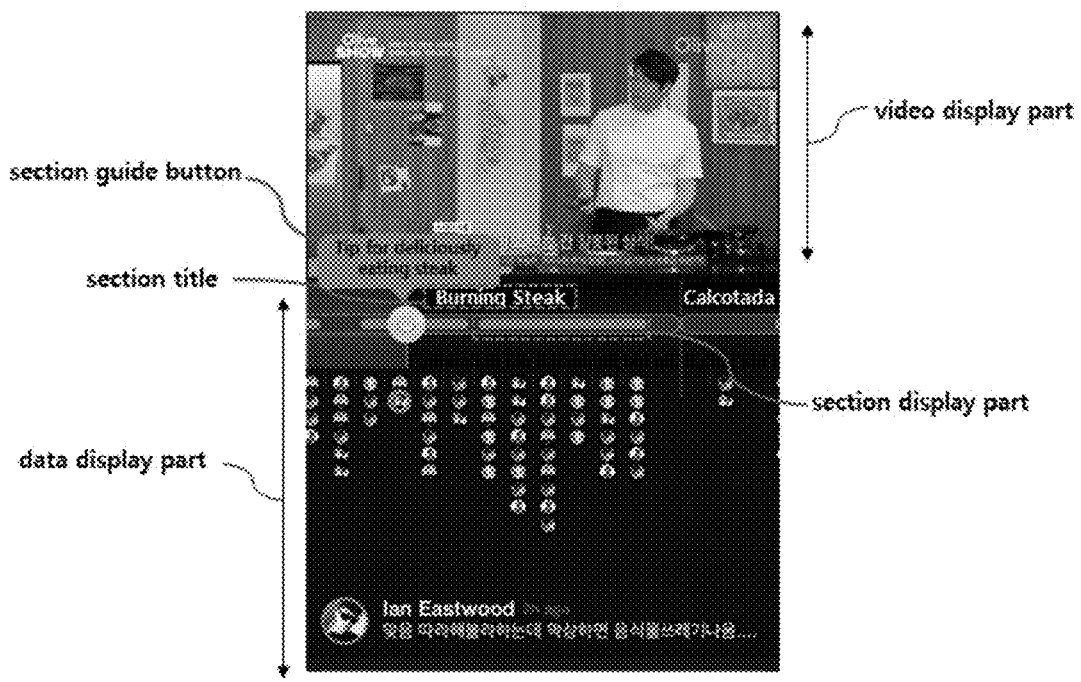
FIG. 11 is an exemplary diagram for explaining the data displaying unit presented in the display device of a user terminal in the user interface device for editing and playing video contents in accordance with an embodiment of the present disclosure.

FIG. 11 is an exemplary diagram for explaining the data displaying unit presented in the display device of a user terminal in the user interface device for editing and playing video contents in accordance with an embodiment of the present disclosure.

As illustrated in FIG. 11, as the corresponding video is played and a specific section of the video is displayed, by clicking the emoticon of a user who wrote a reply for the corresponding video section a user can identify the reply of the corresponding user or all the replies for the corresponding section can be displayed as text format. Additionally the user can write replies or bookmark for each video section as described above.

In addition, the video contents provider supports users to easily identify the structure and the contents of the corresponding video contents by adding simple comments to section displaying area, section title, section guide button, etc. supplied by the video provider.

The section title is used for identifying the contents of video section (for example, burning steak: the corresponding video section includes the process for cooking steak. Moreover, the video provider uses a section title for a group of at least one video section.

In addition the section guide button provide a function to simply write the contents of the corresponding video section in the script for identifying the main contents of the section; additionally to list items of related contents for the corresponding video section by clicking the above section guide button and to offer access to additional information linked to the listed items. For example, a tip to eat a delicious sirloin steak includes delicious sauce for sirloin steak or recipe and users can watch the relevant video sections without search if the video sections containing the above sauce or recipe are linked. In addition the above section guide button describing briefly the contents of the corresponding video section can consist of one video section.

In addition, the section displaying area provide areas for displaying sections in the timeline to intuitively comprehend the structure of video contents and identify the position of information in the video contents. Additionally the section displaying area consists of at least one of video sections.

In addition, a user can expose a specific goods on the section information display part in the timeline, in which the advertisement of the goods can be displayed if a user selects the specific part of the sections in the video contents. Moreover, the context for the specific goods can be included in the lower side of the corresponding section. The context can become the video, linked URL (associated with the $3^{rd}$ party through API), map which are introduced in the corresponding section.

Figure 12:
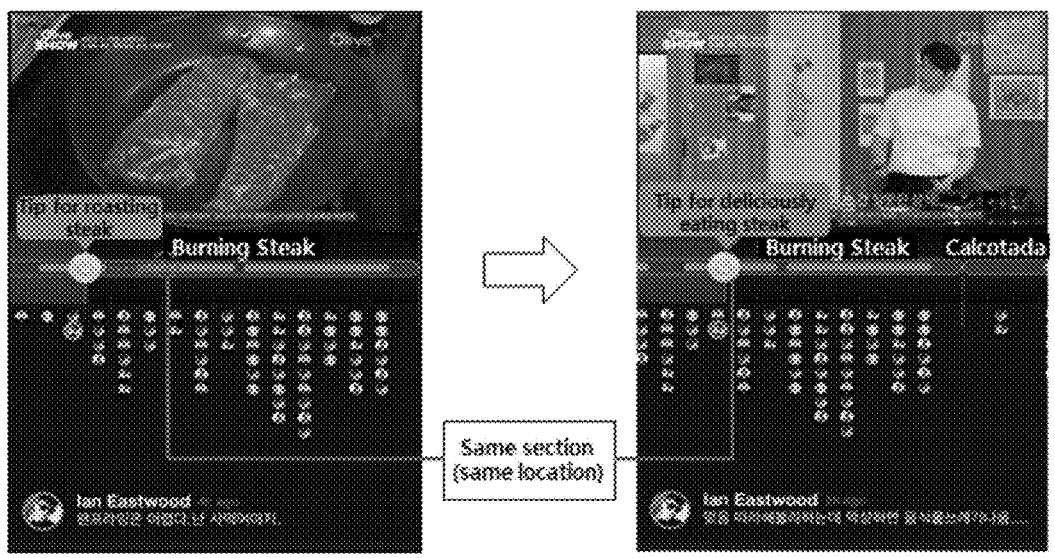
FIG. 12 is an exemplary diagram for explaining the movement between video sections using the search button in the user interface device for editing and playing video contents in accordance with an embodiment of the present disclosure.

FIG. 12 is an exemplary diagram for explaining the movement between video sections using the search button in the user interface device for editing and playing video contents in accordance with an embodiment of the present disclosure.

As described above, the user moves the search button to the desired section in the video by dragging the search button 222 to search the corresponding video.

As illustrated in FIG. 12, in case of a video section having a section guide button that describes the current video section in the corresponding video has a tip for roasting steak, the user can read user replies to the tip for roasting steak. The quantified result based on the number of emoticons of users writing replies can be shown and it indicates the degree of preference for each section and principal sections at once as described above.

Next, if the user moves to the video section having a tip for deliciously eating steak, the replies of users to the tip in the corresponding video section are shown and the user also writes one's own reply in real-time.

In addition the user manages the corresponding video section as one's own video contents using bookmark and memo functions.

In addition, the user can move and watch the video sections of the contents related the tip for deliciously eating steak by clicking the section guide button in the corresponding video section.

Figure 13:
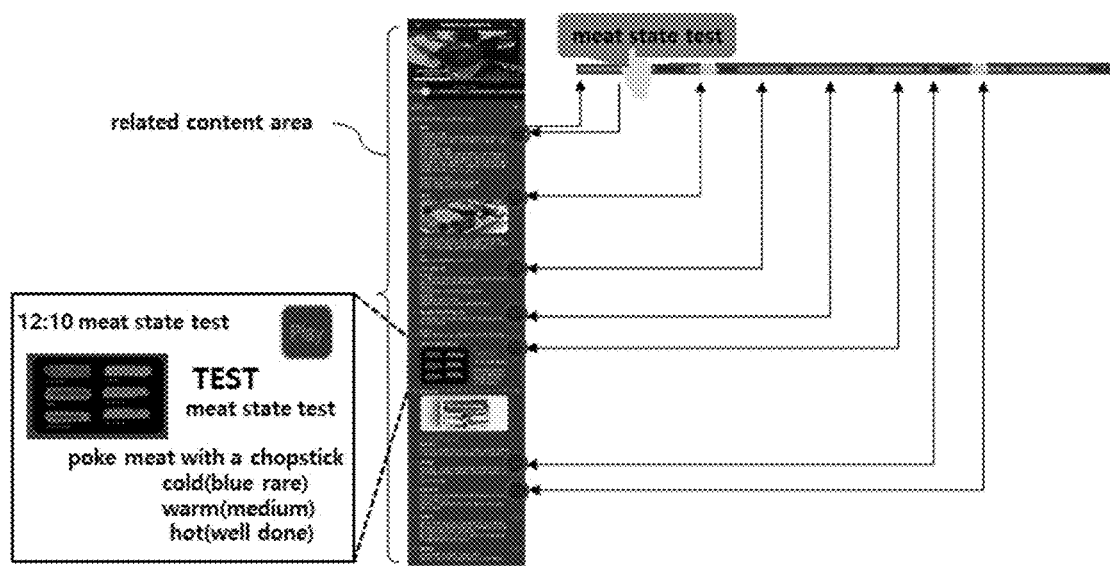
FIG. 13 is an exemplary diagram for explaining the use of related contents in the user interface device for editing and playing video contents in accordance with an embodiment of the present disclosure.

FIG. 13 is an exemplary diagram for explaining the use of related contents in the user interface device for editing and playing video contents in accordance with an embodiment of the present disclosure.

As shown in FIG. 13, the video provider sets up related contents area using the user interface device 200; displays items of related contents for the corresponding video section if the user clicks the section guide button; and makes moving and watching the video sections containing the information of related contents by clicking the play button in each of the contents.

It contributes increased access to related contents and increased availability by providing moving easily in the entire video so as to navigate the video section of the related contents.

Figure 14:
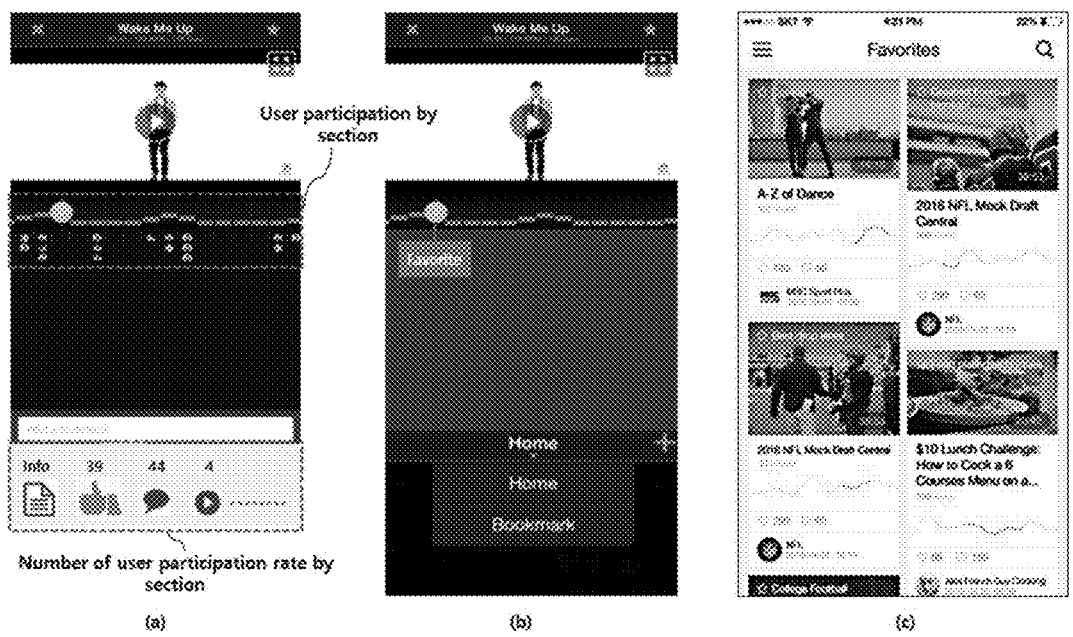
FIG. 14 is an exemplary diagram for showing the degree of user participation and bookmark for each video section in the user interface device for editing and playing video contents in accordance with an embodiment of the present disclosure.

FIG. 14 is an exemplary diagram for showing the degree of user participation and bookmark for each video section in the user interface device for editing and playing video contents in accordance with an embodiment of the present disclosure.

As described above, the above user interface device 200 quantifies user data accumulated by user participation for each section and provides comparison data for each section so that users identify and easily access the sections of high user participation.

As shown in FIG. 14(a), the user interface device 200 quantifies user participation data for each section using the user data (reply, number of recommendation, number of playback for each section, etc.).

The quantified user participation data for each section is displayed on the display device in the user terminal as text or graph format; or the number of replies, the number of recommendations, and the number of playback of the corresponding section are also displayed as FIG.s.

The statistics of video contents can be used to insert advertisements in the future. In other words, the statistics can be used as grounds for attracting advertisers, and selling and charging advertisement.

In other words, as the consumption of video contents becomes popular, the advertisement before or after a specific section of the video contents showing high traffic volume can be inserted so that advertisement of products contained in the corresponding video contents or similar products or service related with the above products can be inserted dynamically. The advertisement effect can be reinforced by providing customized advertisement according to the corresponding video contents using the statistics of the video section including consumer information of the video contents and playback information.

Meanwhile the information of the corresponding video section is explained briefly and displayed.

In addition the height of the section indicator 223 corresponding video section can be displayed, and emoticons for the users who write replies to the corresponding video section are enumerated and displayed.

In addition as described above, identifying principal sections and degree of user participation is easy and moving to other sections by clicking the search button or the seek bar 221 in the corresponding video section is facilitated.

As shown in FIG. 14(b), the user interface device 200 provides users with bookmark function for the video section.

The bookmark function provides users with a function for writing and managing user data (memo, bookmark) at the desired point in the video contents.

In addition, the bookmark function enables users to manage the bookmarked video contents by writing their own memos through bookmark and memo functions in the video contents, and to move and watch the corresponding video section directly with the access path using bookmark function.

In addition, a new video contents can be created by editing and combining the above bookmarked videos.

As shown in FIG. 14(c), a graph describing user participation rate by section is overlapped on each video contents. The part for explaining the content of the video contents can be shown in the bottom area of the video contents, and the title of the video contents can also be displayed by being overlapped with the video contents.

The bookmark are can be highlighted within a part of the graph denoting the user participation rate. The user can intuitively FIG. out the most favorite part of the video section among the video contents without searching the detailed content of the video contents.

Multiple contents also can be seen on a single terminal, and thus the user can FIG. out the most popular video contents among multiple video contents. And then the most popular section in the most popular video contents can also be easily accessed.

Moreover, a user can collect specific video sections from the total sections of the video contents, and reproduce a new video contents by tagging, grouping by users, or combining associated sections with a single clip. That is a new video contents can be reproduced through bookmark function according to specific objective and usage.

Figure 15:
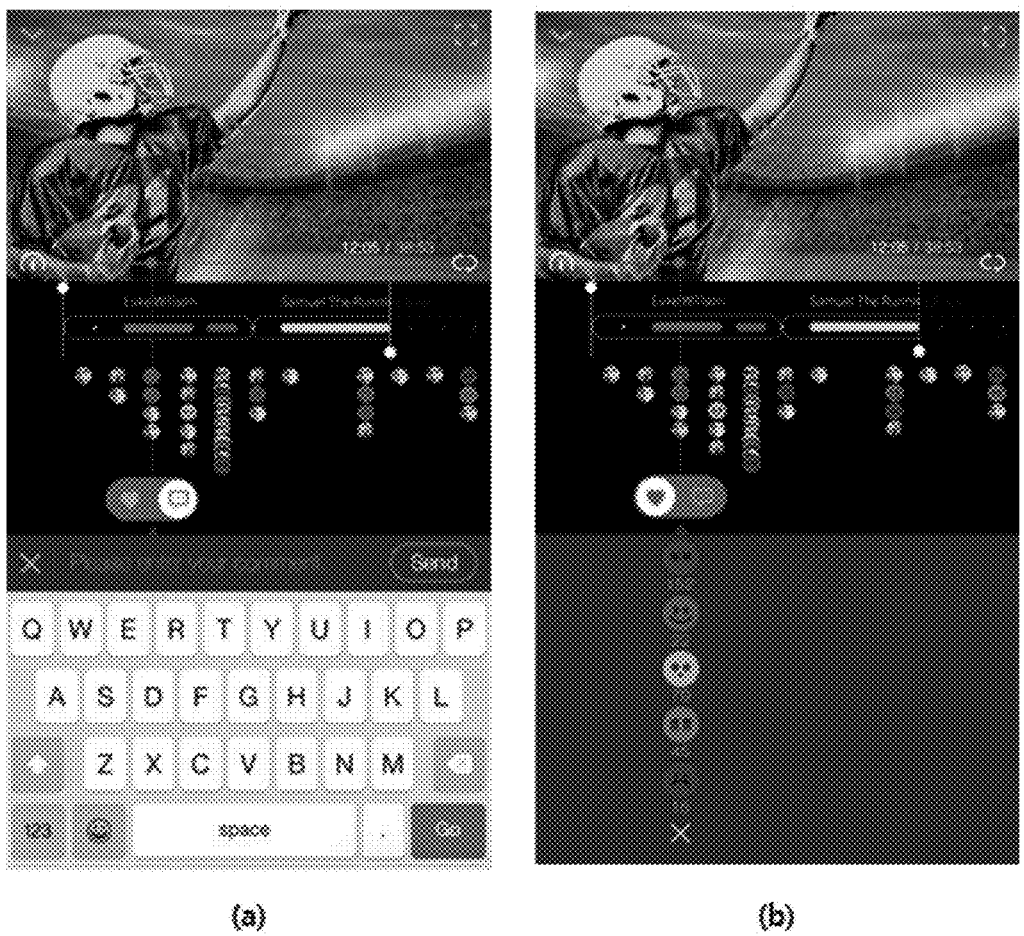
FIG. 15 is an exemplary diagram for modularized managing and dividing method for the section information of the video contents in the user interface device for editing and playing video contents in accordance with an embodiment of the present disclosure.

FIG. 15 is an exemplary diagram for modularized managing and dividing method for the section information of the video contents in the user interface device for editing and playing video contents in accordance with an embodiment of the present disclosure.

As shown in FIGS. 15(a) and (b), the modularization of the section information of the video contents is to modularize the video segments by dividing the video contents. Each modularized information has its own unique information, which can be individually managed and divided into categories. The unique information includes file name, file format, assigned size, or frame information, and a user can input additional information.

The information capable of being inputted to the modularized video includes title, description, video, linked URL, map, #tag or the combinations thereof. Wherein linked URL enables the association with $3^{rd}$ party through API.

Moreover, the present disclosure provides input and edit functions supported in micro blog, and thus the input information becomes to be an object so as to be able to easy input, modify/delete the information.

For example, the method for inputting maker which is the producer of a video contents is to enter the corresponding words by mapping section by section with the title. The usage provided by the maker can also be inserted by adding/deleting the information in the modularized videos. Thus, it is used like an editor of a blog.

A user can input the text based information as well as icons, emoticon and their equivalents to the segmented/modularized videos.

Figure 16:
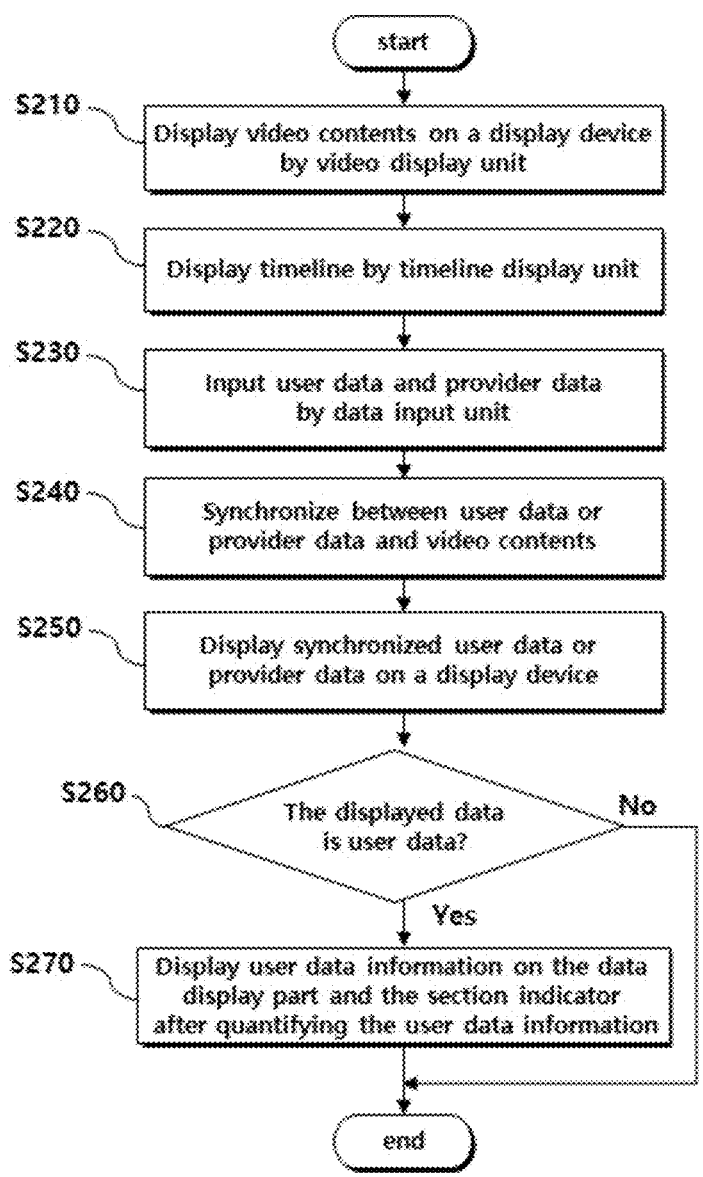
FIG. 16 is a flow chart for explaining the process of displaying provider data or user data entered in real-time in the user interface device for editing and playing video contents in accordance with an embodiment of the present disclosure.

FIG. 16 is a flow chart for explaining the process of displaying provider data or user data entered in real-time in the user interface device for editing and playing video contents in accordance with an embodiment of the present disclosure.

As shown in FIG. 16, in the procedure to display the provider data or the user data entered with the user interface device 200, firstly the video display unit displays on the display device the video contents the video provider supplies (S210). Next the timeline is displayed to intuitively understand the information of the displayed video contents on the display device (S220). Meanwhile the timeline consists of a seek bar, a search button, and a section indicator as described above.

Next the user data or provider data is entered through the data input unit (S230). Next synchronizing the above entered user data or provider data with the corresponding video contents is performed (S240). Meanwhile the synchronization of the above user data and the provider data with the video contents is already explained in detail and we omit detailed explanations (S250).

Next synchronized user data or provider data is displayed on the display device through the data display unit (S260); in case the user data is displayed (S260), after quantifying the displayed user data, the quantified results can be displayed as FIG.s on the display device through the data display part or displayed on the display device as height of the section indicator through the timeline display unit (S270).

As explained above, the user interface device for editing and playing video contents the method thereof in accordance with an embodiment of the present disclosure enables users to interact with other users rather than merely watching video contents passively; to provide diverse ways to access the above video contents through providing various functions; and to increase the use of video contents by navigating freely the interesting video sections to the users.

The above explanation has been described with reference to a desirable embodiment mainly but the technical scope of the present disclosure is not limited to this explanation; each component of the present disclosure can be changed and modified according to the technical scope of the present disclosure to achieve the same purpose and effect of the present disclosure.

In addition, the present disclosure has been illustrated and described with reference to a desirable embodiment but the present inventive concept is not limited to the described specific embodiment and the various and equivalent embodiments within the essential points of the patent claims in the present disclosure are possible by those who have ordinary knowledge in the area the present disclosure belongs to. The various and equivalent embodiments are not understood differently from the technical scope and outlook for the present disclosure.

What is claimed is:

1. An apparatus for reproducing a video contents through data structuring, wherein the apparatus comprises:
    a video section searching unit searching video sections from at least one original video contents according to a search condition entered by a user, wherein the search condition comprises a bookmark, a hash tag, a reply, video section information, a memo, a keyword or a combination thereof;
    a video section collecting unit collecting selectively at least one of the video sections from the searched video sections;
    an analyzing unit providing users with combining conditions for grouping or rearranging the video sections collected based on time, place, character, genre, statistics or a combination thereof; and
    a video section combining unit combining, based on the combining conditions, at least one of the collected video sections and creating a reproduced video contents,
    wherein the reproduced video contents is data-structured with a plurality of information fields for the collected video sections out of video sections subdivided with the search conditions from the original video contents, wherein the information fields comprise at least one selected from the group consisting of a section information field containing information for each video section, a reply field containing information on replies, a hash tag field containing hash tag information, a memo field and a bookmark field, such that the reproduced video contents is programmed to group or rearrange the video sections according to the combining conditions and be played back by the data structure.

2. The apparatus according to claim 1, wherein the apparatus further comprises:
    a result verifying unit verifying the reproduced video contents via providing the reproduced video contents to a user; and
    a video contents correcting unit deleting a single or multiple parts of specific video sections in the reproduced video contents, or correcting the reproduced video contents by adding a single or multiple video sections or changing with a single or multiple video sections.

3. The apparatus according to claim 1, wherein the apparatus is configured to comprise:
    provisioning a customized advertisement inserted in, before, or after the specific section of the reproduced video contents according to the time, place, character, genre, statistics or the combinations thereof.

4. A method for reproducing a video contents through data structuring, the method comprising:
    searching video sections from at least one original video contents according to a search condition, wherein the search condition comprises a bookmark, a hash tag, a reply, video section information, a memo, a keyword or a combination thereof;
    accumulating at least one of the searched video contents;
    collecting at least one of the video sections from the accumulated video contents;
    analyzing to provide a combining condition for grouping or rearranging the video sections collected based on time, place, character, genre, statistics or the combinations thereof; and
    based on the combining condition, combining at least one of the collected video sections and creating a reproduced video contents,
    wherein the reproduced video contents is data-structured with a plurality of information fields for the video sections out of video sections subdivided with the search conditions from the original video contents, wherein the information fields comprise at least one selected from the group consisting of a section information field containing information for each video section, a reply field containing information on replies, a hash tag field containing hash tag information, a memo field and a bookmark field, such that the reproduced video contents is programmed to group or rearrange the video sections according to the combining conditions and be played back by the data structure.

5. The method according to claim 4, wherein the method further comprises:
    verifying the reproduced video contents via providing the reproduced video contents to a user, and
    when the reproduced video contents is modified by deleting a single or multiple parts of specific video sections or adding a single or multiple video sections, a new video content is reproduced by combining at least one of the modified video sections.

6. The method according to claim 4, wherein the method further comprises:
    verifying the reproduced video contents via providing the reproduced video contents to a user, and
    when the reproduced video contents is modified by deleting a single or multiple parts of specific video sections or adding a single or multiple video sections, a new video content is reproduced by combining at least one of the modified video sections with the video sections except the fixed video sections if some of video sections are fixed, and all of the video sections otherwise.

7. The method according to claim 4, wherein the method further comprises:
    provisioning a user customized advertisement in, before, or after the specific section of the reproduced video contents according to the time, place, character, genre, statistics or the combinations thereof.

* * * * *